United States Patent [19]

Tanuma et al.

[11] Patent Number: 4,769,585

[45] Date of Patent: Sep. 6, 1988

[54] METHOD OF CONTROLLING A LINE-FEED STEPPING MOTOR IN A PRINTER AND A DRIVER CIRCUIT THEREFOR

[75] Inventors: Jiro Tanuma; Takao Uchida; Chihiro Komori; Kuniharu Hayashi, all of Tokyo, Japan

[73] Assignee: OKI Electric Industry Co., Ltd., Tokyo, Japan

[21] Appl. No.: 67,247

[22] Filed: Jun. 26, 1987

[30] Foreign Application Priority Data

Jul. 1, 1986 [JP] Japan ................................ 61-152801

[51] Int. Cl.[4] ................................................ H02P 8/00

[52] U.S. Cl. .................................... 318/696; 318/685; 400/568; 400/902

[58] Field of Search ................ 318/676, 685; 400/568, 400/902, 120

[56] References Cited

U.S. PATENT DOCUMENTS 3,874,493 4/1975 Boyd .................................. 400/120

3,902,584 9/1975 Lee et al. ............................ 400/568

*Primary Examiner*—William M. Shoop, Jr.

*Assistant Examiner*—M. Bergmann

*Attorney, Agent, or Firm*—Spencer & Frank

[57] ABSTRACT

In a printer in which a printing medium is moved by a line-feed stepping motor during line-feed operation, and the line-feed stepping motor is stopped during printing operation and in a ready state, the line-feed stepping motor is caused to generate a first holding torque for preventing unwanted movement of the printing medium while permitting the operator to feed the printing medium manually, in the ready state of the printer, and the line-feed stepping motor is caused to generate a second holding torque which is greater than the first holding torque, during the printing operation.

9 Claims, 5 Drawing Sheets

METHOD OF CONTROLLING A LINE-FEED STEPPING MOTOR IN A PRINTER AND A DRIVER CIRCUIT THEREFOR

BACKGROUND OF THE INVENTION

This invention relates to a method of controlling a stepping motor used to perform a line feed in a printer and a driver circuit for driving such a printer. Such a stepping motor is called below a line feed motor.

Printers such as those used in office automation equipment are furnished with a line-feed motor for automatic performance of the line-feed operation. When a line feed is to be made, the line-feed motor receives, on command from the host controller, pulses to cause it to rotate through an angle corresponding to the distance the medium is to be fed. Driven by these pulses, the motor rotates and thereby feeds the printing medium by the commanded amount. After the line-feed operation, the line-feed motor is held by a certain holding torque, which is selected so as to prevent the printing medium from being moved by outside forces, but to permit the printing medium to be fed manually by the operator. This torque is on the order of 1/5 to 1/10 of the torque used to feed the printing medium, the exact value depending on the particular line-feed motor.

A block diagram of the printer's circuit configuration is shown in FIG. 1. The microprocessor (μCPU) 1 communicates via an address/data bus 2 with a read-only memory (ROM) 3 and a random-access memory (RAM) 4 which it uses to control the printer's operation. The driver circuit 5 causes the line-feed motor 6 to rotate or to hold. The interface controller 7 receives commands from a host controller and sends printer information to the host via the interface connector 8.

FIG. 2 shows a specific example of the circuit configuration of the driver 5 in FIG. 1. This circuit is well known, so a detailed explanation is omitted. It comprises a register 5a which receives timing signals from the microprocessor 1 and produces control signals OVDV, φ1, φ2, φ3 and φ4. These control signals are supplied through open-collector drivers D0 and D1 to D4 to the bases of transistors T0a and T1 to T4a whose emitters are grounded. The collector of the transistor T0a is coupled to the base of an additional transistor T0b whose emitter is connected to a over-voltage drive power supply Vp(e.g., 38 V). The collector of the transistor T0b is connected to center taps of stator windings *6a, 6b* of line-feed motor 6. The ends of the windings *6a, 6b* are connected to the collectors of the transistors T1 to T4. The center taps of the windings *6a, 6b* are also coupled through a diode 10 and a resistor 9 to the logic-level power supply Vcc.

At the beginning of each cycle for each step, the open-collector driver D0, the transistors T0a and T0b are made conductive by the control signal OVDV, and the over-drive power supply Vp is connected to the stator windings through the transistors T0b. When the transistor T0b is nonconductive, the power supply Vcc of a lower voltage supplies current to the stator windings *6a, 6b.* This current produces holding torque when periodic and sequential alternation of the signals φ1 to φ4 are terminated.

In the prior art shown in FIGS. 1 and 2 the printer operates as follows. When the interface controller 7 receives print data from the host via the interface connector 8, the microprocessor 1 first stores the data in the RAM 4. When the data for a line feed (or carriage return) are received, the printer prints one line of data by means of a print head and spacing mechanism not shown in the drawings. Then, if a line feed is to be performed, the signals φ1 to φ4 are alternated in sequence. The overdrive voltage Vp is applied in the first part of each cycle for each step. In the latter part of each cycle for each step, a lower voltage Vcc is applied. The voltages are used for rotating the line-feed motor 6. Thus the line-feed motor 6 is driven to feed the printing medium by the predetermined amount.

After the line-feed operation, the alternation of the signals φ1 to φ4 is terminated and the states of the signals φ1 to φ4 at the time of the termination of the alternation of the signals φ1 to φ4 are maintained. That is, two of the signals φ1 to φ4 that are at the high level at the time the alternation is terminated are kept high and the other two of the signals φ1 to φ4 that are at the low level at the time the alternation is terminated are kept low. As a result, a holding torque is generated in the line-feed motor 6 by the current which flows from the power supply Vcc through the resistor 9 and the diode. The holding torque prevents the printing medium from being moved by external forces.

In the line-feed motor control method described above, a problem arises because the motor has only two torques: the small holding torque that permits the operator to perform manual feeding, and the large torque by which the line-feed motor performs the feeding operation. During the time between one line-feed operation and the next (while the printer is spacing and printing), friction and other large load fluctuations that arise may overcome the small holding torque, leading to step-out.

SUMMARY OF THE INVENTION

An object of this invention is to solve this problem in the prior art by providing a method of controlling the line-feed motor so that step-out does not occur even if load fluctuations occur while the printer is spacing and printing.

Another object of the invention is to provide a drive circuit used for implementing the above method.

The invention provides an improvement in a method of controlling a line-feed stepping motor in which the line-feed motor is controlled by a driver circuit so as to generate a rotational torque for performing the line-feed operation and a holding torque for preventing unwanted motion of the printing medium. According to the invention, to solve the problem of the prior art described above, the driver circuit is configured to generate a first holding torque of a magnitude permitting the operator to feed the printing medium manually, and a second holding torque larger than the first holding torque. The first holding torque is generated when the printer is in the ready state. The second holding torque is generated while the printer is printing.

This invention overcomes large load fluctuations on the printing medium caused by friction and other factors by generating two holding torques, a first holding torque and a stronger second holding torque, and applying the second holding torque during the printing operation. This method of control can effectively prevent step-out, thus solving the above problem of the prior art.

DETAILED DESCRIPTION OF THE EMBODIMENTS

An embodiment of the present invention is described in detail below.

Figure 1:
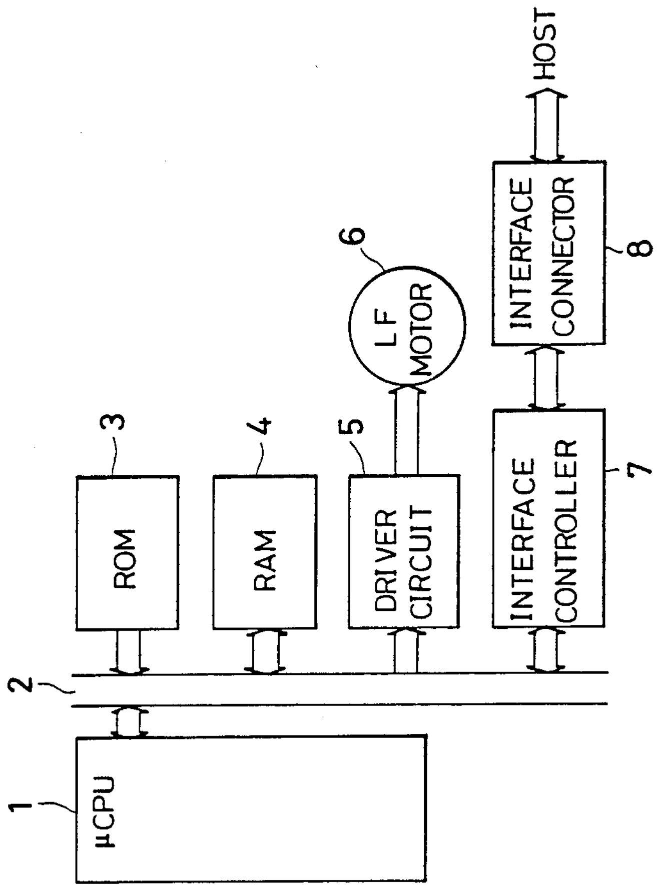
FIG. 1 PRIOR ART
FIG. 1 is a block diagram of the printer's circuit configuration of the prior art.
Figure 2:
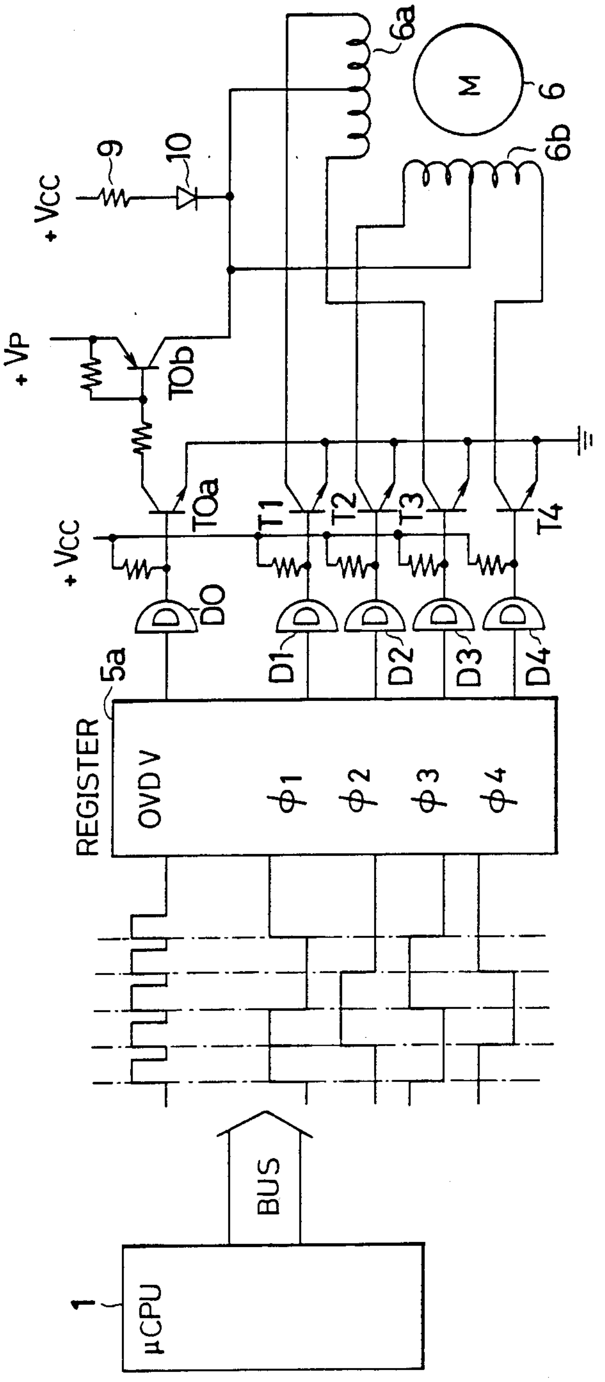
FIG. 2 PRIOR ART
FIG. 2 is a schematic diagram of the driver circuit used in the prior art of FIG. 1.
Figure 3:
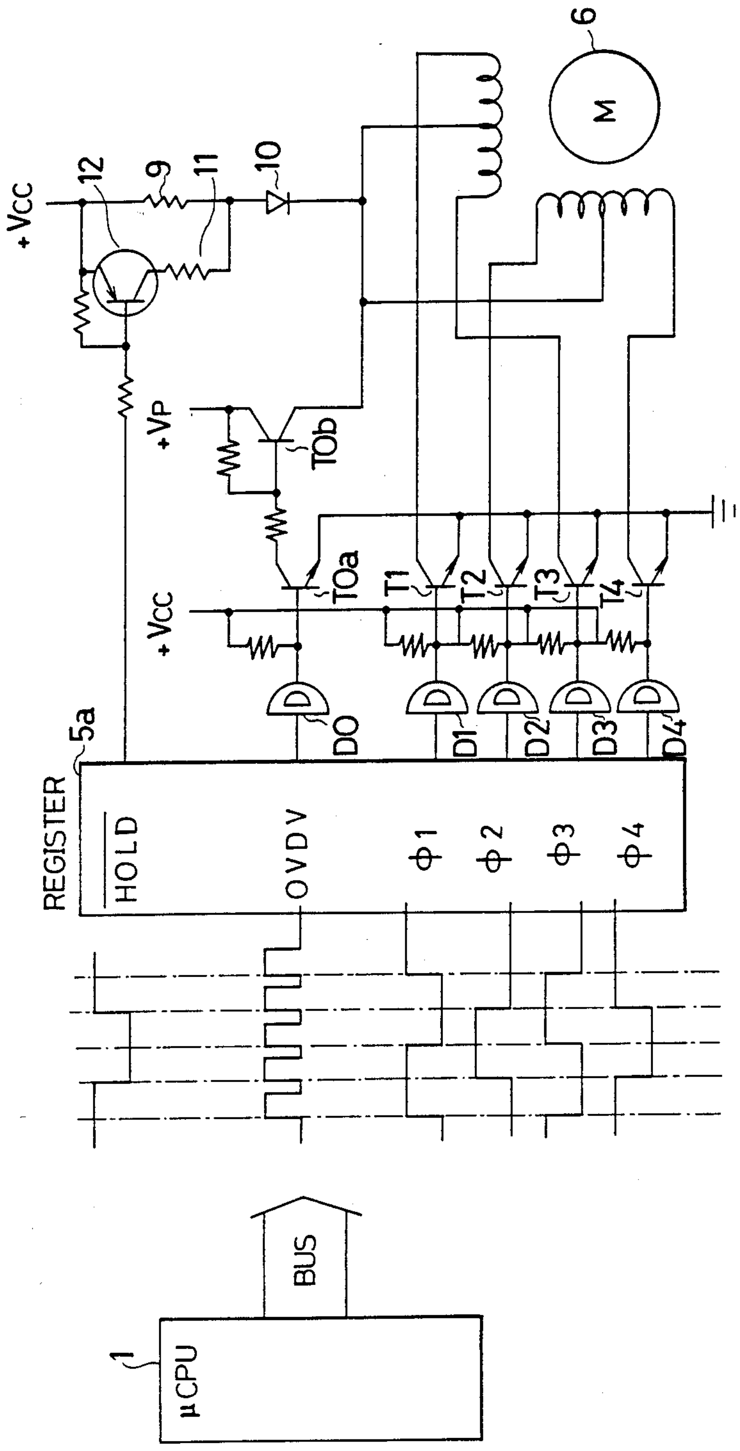
FIG. 3 is a schematic diagram of the driver circuit used in this invention.

A schematic diagram of the driver circuit used in this embodiment is shown in FIG. 3. The features distinguishing this circuit from the circuit shown in FIG. 2 are the addition of the resistor 11 and the transistor 12 and that the microprocessor 1 is modified to produce a control signal $\overline{\text{HOLD}}$. Elements that are identical in FIG. 2 and FIG. 3 are identified by identical reference numbers. The resistor 11 and the transistor 12 are connected in parallel with the resistor 9. The control signal $\overline{\text{HOLD}}$ switches the transistor 12 on and off. Assume that the states of the signals $\phi 1$ to $\phi 4$ are kept unchanged. When the $\overline{\text{HOLD}}$ signal is at the High level, and the transistor 12 is in the off state, the current fed to the line-feed motor 6 is determined only by the resistor 9 and the small holding torque is generated as it is in the prior art. This holding torque is so chosen as to prevent movement by external forces but to permit manual feeding. When the $\overline{\text{HOLD}}$ signal is at the Low level, the transistor 12 is in the on state and in addition to the current fed through the resistor 9 as above, the line-feed motor 6 receives a current determined by the resistor 11, resulting in a stronger holding torque. This stronger holding torque is chosen to prevent step-out due to load variation. The value of this stronger holding torque can be set to any desired value simply by selecting the appropriate constant for the resistor 11.

The operation of this embodiment will next be explained with reference to FIG. 4.

Figure 4:
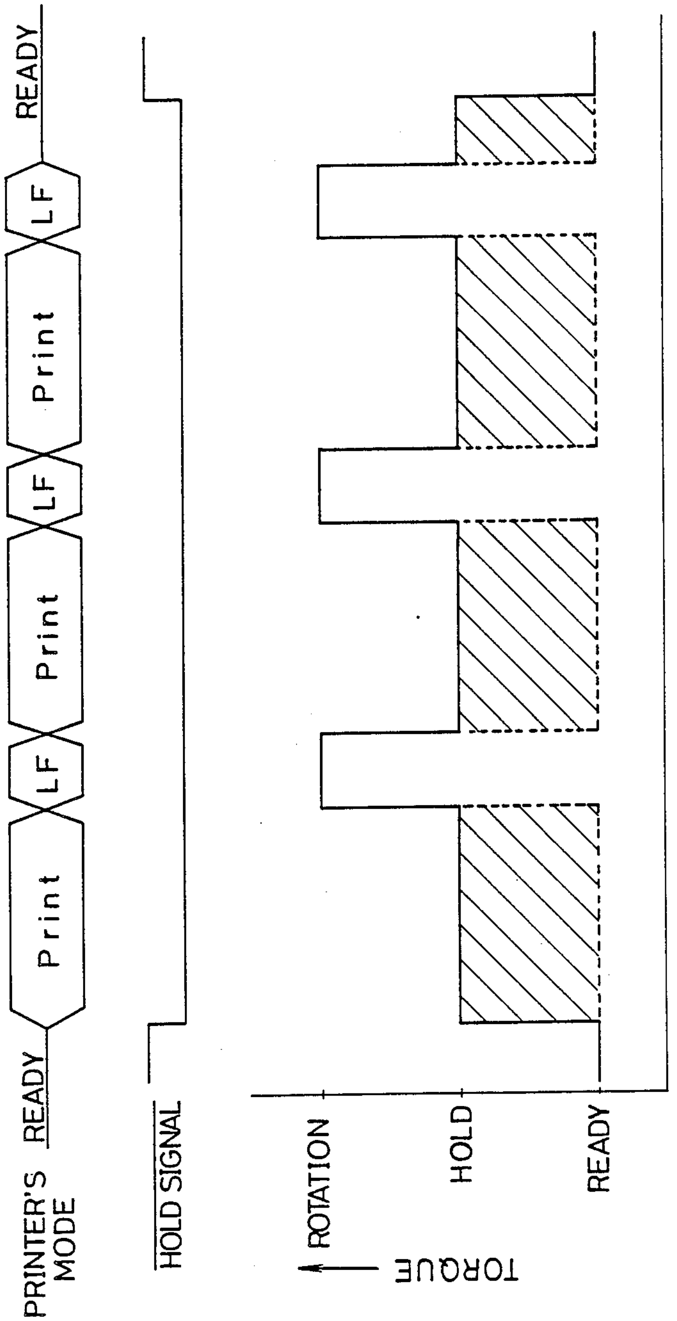
FIG. 4 shows the printer's operating modes, the state of the $\overline{\text{HOLD}}$ signal, and the magnitude of the line-feed motor torque in each mode.

FIG. 4 shows the printer's operating modes, the state of the $\overline{\text{HOLD}}$ signal, and the magnitude of the linefeed motor torque in each mode.

Until it receives data from the host, the printer is in the ready state. The $\overline{\text{HOLD}}$ signal is kept High to allow the operator to set the medium by manual feeding. The holding torque of the line-feed motor 6 in this state has a small value as in the prior art.

Next the printer receives data from the host and enters the printing state to commence operations which include the printing of characters and spaces by a print head and spacing mechanism not shown in the drawing, and line-feed operations. The $\overline{\text{HOLD}}$ signal goes Low when printing begins and remains Low until the end of the printing, i.e., the last printing or line-feed operation is completed, and it is confirmed that there are no more data and the printer's next state will be the ready state; then the $\overline{\text{HOLD}}$ signal returns to the High level. During printing operations, accordingly, the holding torque of the line-feed motor 6 increases to the $\overline{\text{HOLD}}$ level in FIG. 4. During line-feed operations overvoltage drive is performed, i.e., a large rotational torque is used to feed the printing medium as in the prior art.

While the printer in this embodiment is printing, the holding torque is the larger torque indicated by shading in FIG. 4. This holding torque provides sufficient resistance to load fluctuations on the printing medium during the printing process to prevent step-out.

Figure 5:
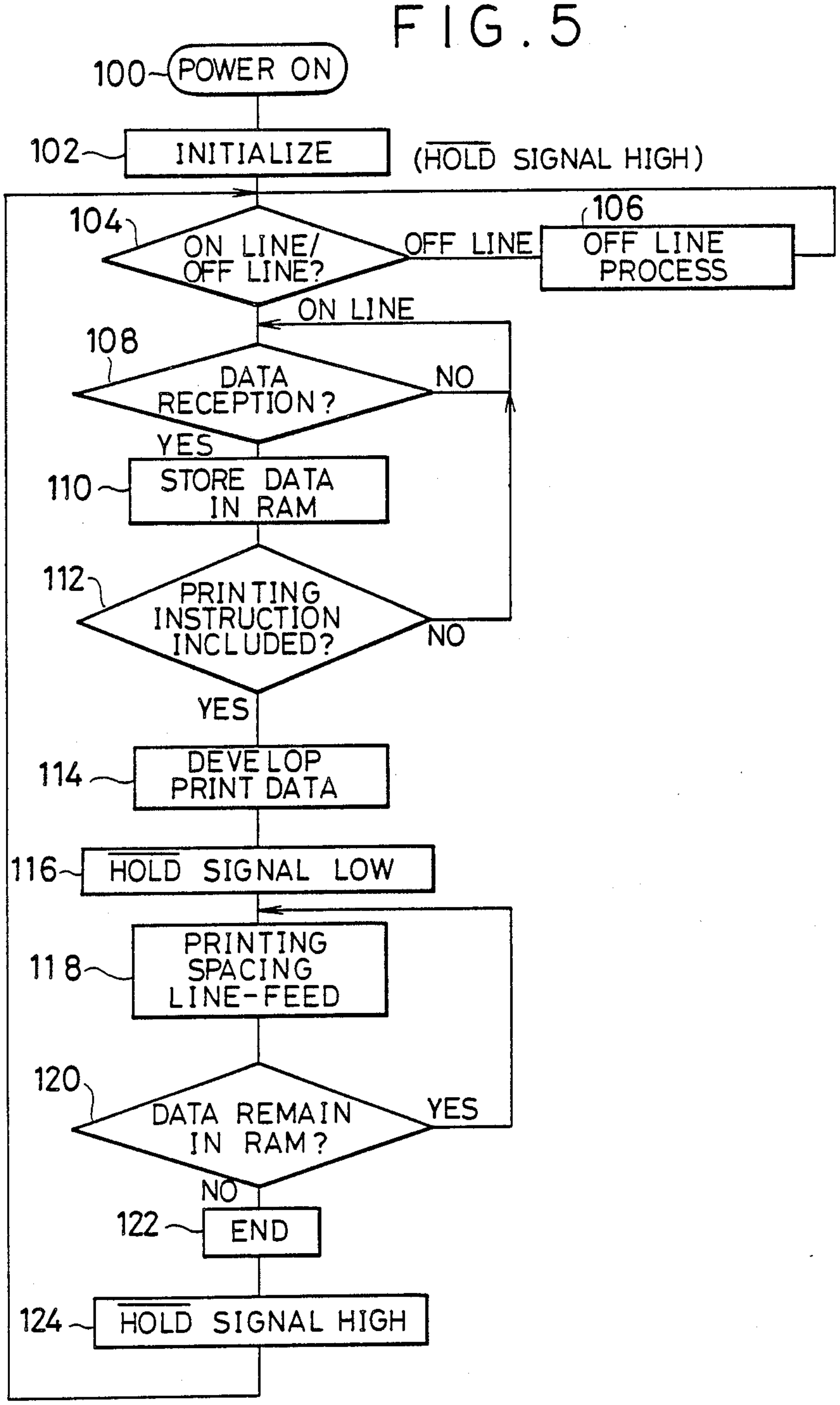
FIG. 5 is a flowchart showing the operation of the microprocessor 1 of FIG. 3.

FIG. 5 shows the operation of the microprocessor 1.

When power is applied the microprocessor 1 (100), initiatization (102) is performed, by which the $\overline{\text{HOLD}}$ signal is set High.

Then it is checked whether the printer is set in the On-Line mode or the Off-Line mode (104). If it is found that the printer is in the Off-Line mode, an off-line processing is performed (106).

If it is found that the printer is in the On-Line mode, the microprocessor 1 then waits for reception of data from the host.

When it receives data, it stores the data in the RAM 4 (110).

The microprocessor 1 then determines whether the data includes the printing instruction (112). If the printing instruction is not included, the procedure is returned to the step 108. When the printing instruction is included, the printing data are developed in the Ram (114), and the $\overline{\text{HOLD}}$ signal is turned Low (116).

Then printing, spacing and line-feed operations (118) are repeated until there remains no more printing data in the RAM (120).

When there is no data in the RAM, the printing is terminated (122) and the $\overline{\text{HOLD}}$ signal is turned High (124).

Then, the procedure is returned to the step 104.

As described in detail above, this invention controls the line-feed motor of a printer so as to provide two holding torques: a first holding torque supplied while the printer is in the ready state, and a second holding torque supplied while the printer is printing. This method of control is capable of preventing the holding torque from being overcome by large fluctuations in load on the printing medium caused by such factors as friction and electrostatic charge, thereby preventing step-out.

What is claimed is:

1. In a printer having a line-feed motor for moving a printing medium, said printer having ready, printing and line-feed states, the method comprising the steps of causing said line-feed motor to generate a first holding torque during said ready state to prevent unwanted movement of said printing medium by an external force, while permitting manual feeding thereof; and causing said line-feed motor to generate a second holding torque during said printing state to prevent movement of said printing medium while data is being printed thereon, the magnitude of said second holding torque being greater than that of said first holding torque.

2. A method according to claim 1 which comprises the further step of causing said line-feed motor to generate a rotational torque during said line-feed state to displace said printing medium.

3. A method according to claim 2 wherein the magnitude of the rotational torque generated during said further step is greater than that of said second holding torque.

4. A method according to claim 1 wherein said second holding torque has a magnitude sufficient to prevent step-out due to load fluctuations during said printing state.

5. A method according to claim 1 wherein the force required for manual feeding of said printing medium is greater than said external force.

6. A method according to claim 1 which comprises the further steps of transmitting a printing instruction to said printer at the beginning of said printing state and an instruction indicating the end of printing when said printing is completed.

7. In combination with a printer having a line-feed stepping motor for moving a printing medium, said printer having ready, printing and line-feed states, and said motor including stator windings, a driver circuit comprising a first resistor coupled between a first voltage source and the stator windings of said line-feed stepping motor, a first holding current flowing through said first resistor and said stator windings thereby causing said motor to generate a first holding torque during said ready state having a magnitude sufficient to prevent unwanted movement of said printing medium by an external force, while permitting manual feeding thereof;

a second resistor and a switching element connected in series, said series-connected second resistor and switching element being connected in parallel with said first resistor; and means for making said switching element conductive during said printing state, a second holding current flowing through said stator windings thereby causing said motor to generate a second holding torque during said printing state which is greater than said first holding torque, said second holding current being the sum of the currents through said first and second resistors.

8. A driver circuit according to claim 7 wherein the stator windings of said line-feed motor have first and second ends, and which further comprises switch means coupling the first end of each of said stator windings to a common reference voltage point;

means coupling the second ends of said stator windings to said first voltage source and to a second voltage source, said second voltage source having a greater magnitude than said first voltage source; and means for making said switch means conductive in a predetermined sequence when said printer is in said line-feed state to alternately connect said first and second voltage sources to said stator windings thereby generating a torque sufficient to move said printing medium, said means further connecting said stator winding to only said first voltage source after the termination of said line-feed state and until a subsequent line-feed state in begun.

9. A driver circuit according to claim 7 wherein said printer further comprises a controller, said controller receiving printing instructions and placing said printer in the printing state.

* * * * *